(12) United States Patent
Wong et al.

(10) Patent No.: US 6,836,750 B2
(45) Date of Patent: Dec. 28, 2004

(54) SYSTEMS AND METHODS FOR PROVIDING AN AUTOMATED DIAGNOSTIC AUDIT FOR CLUSTER COMPUTER SYSTEMS

(75) Inventors: Joseph D. Wong, Roseville, CA (US); Peter A. Put, St. Albert (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 09/840,784

(22) Filed: Apr. 23, 2001

(65) Prior Publication Data

US 2002/0157035 A1 Oct. 24, 2002

(51) Int. Cl.[7] .............................................. G06F 11/30
(52) U.S. Cl. ....................... 702/186; 702/188; 702/183; 709/224
(58) Field of Search ......................... 702/186, 81, 83, 702/122, 123, 179, 180, 182, 183, 187, 188; 714/3, 4, 6, 11, 12, 7, 18, 19, 37; 709/224, 229, 223, 220, 221; 705/7

(56) References Cited

U.S. PATENT DOCUMENTS

| | | | | |
|---|---|---|---|---|
| 6,038,677 A | * | 3/2000 | Lawlor et al. ................. 714/4 |
| 6,092,213 A | * | 7/2000 | Lennie et al. .................. 714/3 |
| 6,101,508 A | * | 8/2000 | Wolff ........................... 709/223 |
| 6,192,410 B1 | | 2/2001 | Miller et al. ................. 709/232 |
| 6,691,244 B1 | * | 2/2004 | Kampe et al. ................. 714/4 |

* cited by examiner

Primary Examiner—Hal Wachsman

(57) ABSTRACT

Systems and methods for providing an automated diagnostic audit for computer cluster systems are provided. One such method includes receiving information associated with the cluster computer system, the information comprising a plurality of system configuration parameters for each of the plurality of nodes in the cluster computer system; defining a plurality of system configuration categories associated with the plurality of system configuration parameters and a threshold benchmark for each of the plurality of system configuration categories, each of the threshold benchmarks based on a predefined set of rules; associating each of a portion of the plurality of system configuration parameters for each of the plurality of nodes with one of the plurality of system configuration categories; and generating audit information, the audit information based on a comparison of each of the portions for each of the plurality of nodes to the threshold benchmark for the associated system configuration category.

60 Claims, 6 Drawing Sheets

| NODE 502 | CPU 504 | RAM 506 | Swap 508 | Disk 510 | Net Card 512 | O/S Rev 514 | Patch 516 | Apps 518 | Users 520 | Cluster S/W 522 |
|---|---|---|---|---|---|---|---|---|---|---|
| NODE 1 | A | A | B | B | A | C | A | B | B | U |
| NODE 2 | A | A | B | B | C | C | A | B | B | B |
| NODE 3 | A | A | A | B | B | A | B | A | A | A |
| NODE 4 | A | A | A | A | B | A | B | B | C | U |
| NODE 5 | A | A | B | B | A | C | A | B | B | B |
| NODE 6 | A | A | B | B | A | C | A | B | B | B |

(A) Conforms, (B) Warning, (C) Issue; (U)nknown

FIG. 5

SYSTEMS AND METHODS FOR PROVIDING AN AUTOMATED DIAGNOSTIC AUDIT FOR CLUSTER COMPUTER SYSTEMS

TECHNICAL FIELD

The present invention is generally related to cluster computing systems, and more particularly, is related to providing diagnostic audits for cluster computer systems.

BACKGROUND OF THE INVENTION

Within the computing industry, there is an ongoing demand for information technology (IT) solutions that provide cost-effective, flexible, and fault-tolerant software applications to multiple computer users within a cluster computer system. A cluster computer system typically refers to a collection of computers, servers, or workstations interconnected via a communications network for the purpose of reliably providing a mission-critical software application to clients supported by the collection of computers, servers, or workstations. In general, the computers that comprise a cluster computer system work collectively as an integrated computing resource to provide the mission-critical software application. Cluster middleware is designed to protect the cluster computer system from a wide variety of hardware and software failures that may affect the provisioning of the mission-critical software application. For example, cluster middleware is responsible for providing what is referred to in the art as a Single System Image (SSI) of the cluster computer system by ensuring that the resources on computer A will be available on computer B in the event of some hardware or software failure related to computer A. In other words, the cluster middleware glues together the operating systems of each computer within the cluster computer system to offer reliable access to the mission-critical software application. Typically, cluster middleware performs a variety of tasks related to the cluster computer system, such as, for example, checkpointing, automatic failover, recovery from failure, and fault-tolerant support among all of the computers in the cluster computer system.

Notwithstanding the existence of robust cluster middleware, there is also a substantial demand in the cluster computer system environment for diagnostic tools and services for monitoring the consistency and operational capability of the cluster computer system. Currently, diagnostic services for cluster computer systems are performed manually by service personnel. For example, service personnel have to first run a series of data collection tools to gather data related to the cluster computer system. In situations where different computers within the cluster computer system have different operating systems, the data collection tools typically have to be performed for each type of operating system. After the data related to the cluster computer system is collected, the service personnel have to perform a manual analysis of the data to ensure that there is consistency between the corresponding computers for each type of operating system. This manual analysis may be extremely time-consuming and expensive, and because the analysis is manual, the diagnostic service is susceptible to error and variations between personnel performing the analysis. Furthermore, manual analysis becomes increasingly problematic as the number of computers in the cluster computer system increases. As more and more data is gathered by the collection tools, it becomes increasingly difficult for service personnel to perform a meaningful diagnostic audit. For instance, instead of proactively providing meaningful diagnostic information by comparing the relative consistency of each computer within the cluster computer system, service personnel are confined to reactively explaining the differences between various computers within the cluster computer system.

Thus, there is a need in the industry to address these deficiencies and inadequacies.

SUMMARY OF THE INVENTION

The present invention provides systems and methods for providing an automated diagnostic audit for cluster computer systems.

Briefly described, in architecture, one of many possible implementations of a system for providing an automated diagnostic audit for a cluster computer system comprises: means for receiving information associated with the cluster computer system, the information comprising a plurality of system configuration parameters for each of a plurality of nodes in the cluster computer system; means for defining a plurality of system configuration categories associated with the plurality of system configuration parameters; means for defining a threshold benchmark for each of the plurality of system configuration categories, each of the plurality of threshold benchmarks based on a predefined set of rules; means for associating each of a portion of the plurality of system configuration parameters for each of the plurality of nodes with one of the plurality of system configuration categories; and means for generating audit information, the audit information based on a comparison of each of the plurality of system configuration parameters for each of the plurality of nodes to the threshold benchmark for the associated system configuration category. The system may further comprise means for providing the audit information to a network management entity associated with the cluster computer system.

Another system for providing an automated diagnostic audit for a cluster computer system comprises: means for collecting information associated with the cluster computer system, the information comprising a plurality of system configuration parameters for each of the plurality of nodes in the cluster computer system; means for providing the information associated with the cluster computer system to an application service provider; and means for receiving diagnostic audit information generated by the application service provider. The diagnostic audit information may correspond to at least a portion of the information associated with the cluster computer system. Furthermore, the diagnostic audit information received by the system may be determined by: defining a plurality of system configuration categories associated with the plurality of system configuration parameters; defining a threshold benchmark for each of the plurality of system configuration categories, each of the plurality of threshold benchmarks based on a predefined set of rules; associating each of a portion of the plurality of system configuration parameters for each of the plurality of nodes with one of the plurality of system configuration categories; and comparing each of the portion of the plurality of system configuration parameters for each of the plurality of nodes to the threshold benchmark for the associated system configuration category.

The present invention may also be viewed as providing one or more methods for providing an automated diagnostic audit for a cluster computer system. Briefly, one such method involves the steps of: receiving information associated with the cluster computer system, the information comprising a plurality of system configuration parameters for each of the plurality of nodes in the cluster computer system; defining a plurality of system configuration categories associated with the plurality of system configuration parameters; defining a threshold benchmark for each of the plurality of system configuration categories, each of the plurality of threshold benchmarks based on a predefined set of rules; associating each of a portion of the plurality of system configuration parameters for each of the plurality of nodes with one of the plurality of system configuration categories; and generating audit information, the audit information based on a comparison of each of the plurality of system configuration parameters for each of the plurality of nodes to the threshold benchmark for the associated system configuration category.

Briefly, another such method for providing an automated diagnostic audit for a cluster computer system involves the steps of: collecting information associated with the cluster computer system, the information comprising a plurality of system configuration parameters for each of the plurality of nodes in the cluster computer system; providing the information associated with the cluster computer system to an application service provider; and receiving diagnostic audit information generated by the application service provider, the diagnostic audit information corresponding to at least a portion of the information associated with the cluster computer system. The diagnostic audit information received by the system may be determined by: defining a plurality of system configuration categories associated with the plurality of system configuration parameters; defining a threshold benchmark for each of the plurality of system configuration categories, each of the plurality of threshold benchmarks based on a predefined set of rules; associating each of a portion of the plurality of system configuration parameters for each of the plurality of nodes with one of the plurality of system configuration categories; and comparing each of the portion of the plurality of system configuration parameters for each of the plurality of nodes to the threshold benchmark for the associated system configuration category.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 illustrates one of a number of possible embodiments of a cluster audit display generated from the information provided by the automated cluster audit system of FIGS. 1 and 2.

DETAILED DESCRIPTION OF THE PREFERRED EMBODIMENT

I. System Overview

Figure 1:
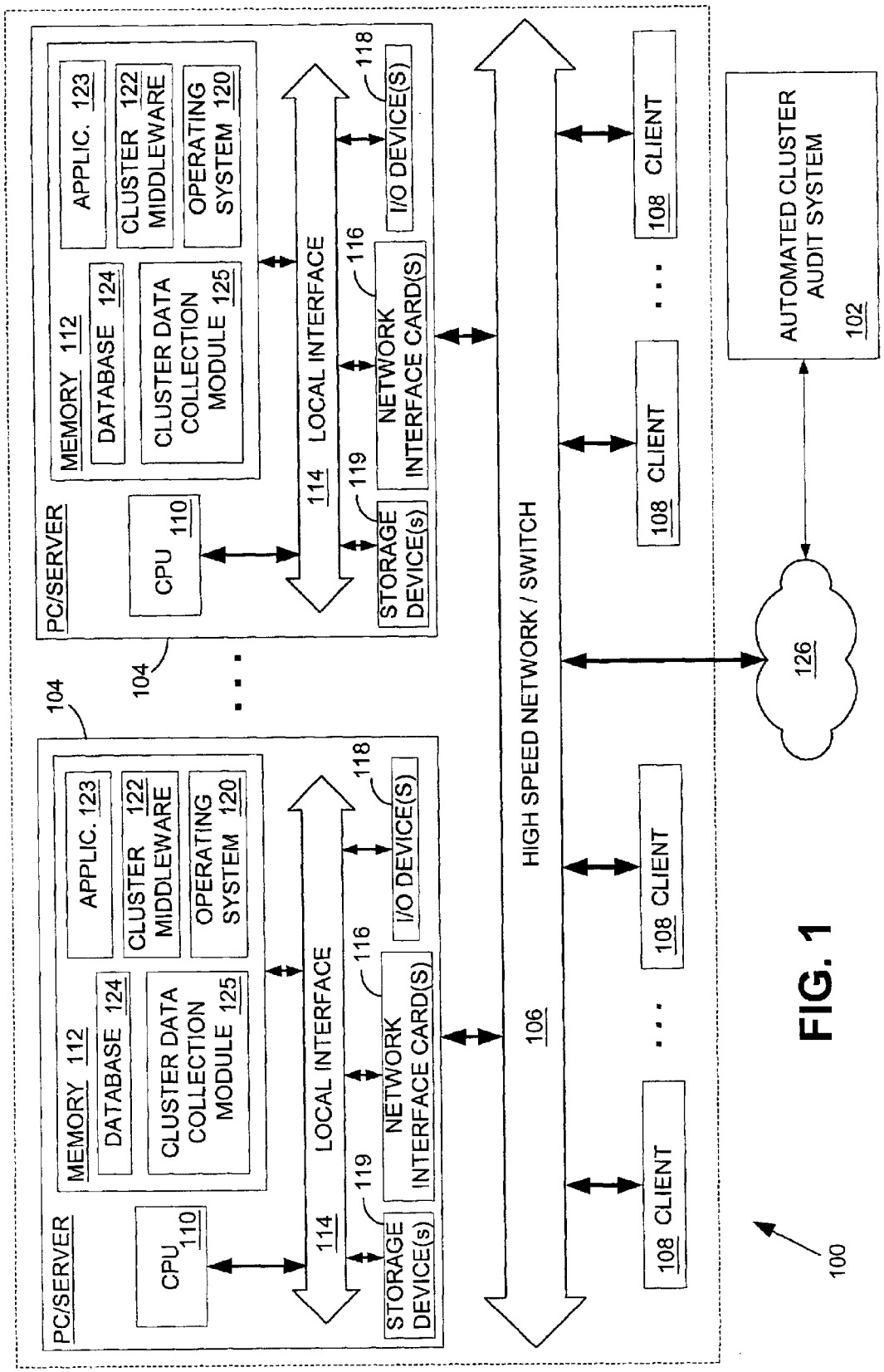
FIG. 1 is a block diagram of a cluster computer system and one of a number of possible embodiments of an automated cluster audit system according to the systems and methods of the present invention.

FIG. 1 is a block diagram of a cluster computer system 100 and one of a number of possible embodiments of an automated cluster audit system 102 according to the systems and methods of the present invention for providing an automated diagnostic audit of cluster computer system 100. Cluster computer system 100 comprises a plurality of nodes 104 interconnected via a local cluster interface 106. Local cluster interface 106 may be a communication network, such as, for example, a local area network (LAN), a metropolitan area network (MAN), a wide area network (WAN), or any other type of communication network employing any network topology, transmission medium, or network protocol. In other embodiments, local cluster interface 106 may be a switch.

Each node 104 communicates with a plurality of clients 108 via any type of communication network, such as, for example, local cluster interface 106. In general, cluster computer system 100 operates as a single computing resource for delivering a mission-critical or time-critical computer application. Nonlimiting examples of such mission-critical or time-critical computer applications include: APACHE Web Server, ORACLE Parallel Server Database, PEOPLESOFT Human Resource Management Software, SAP Supply Chain Management Software.

Nodes 104 may be any single or multiprocessor computer system, such as, for example, a personal computer (PC), server, a workstation, or any other similar system based on any type of computer architecture. In other embodiments, nodes 104 may themselves be clusters of PCs, servers, or workstations. Cluster computer system 100 may also support a number of node configurations. For example, in some embodiments, cluster computer system 100 may be a homogeneous cluster in which each node 104 has a similar computer architecture and a similar operating system. In other embodiments, cluster computer system 100 may be a heterogeneous cluster in which different nodes 104 have different computer architectures and different operating systems.

Nodes 104 may comprise a central processing unit (CPU) 110, memory 112, local interface 114, a network interface card 116, input/output (I/O) device(s) 118, and storage device 119. CPU 110 may be based on any of a number of processor architectures, including, for example, RISC, CISC, VLIW, and Vector. Memory 112 may comprise an operating system 120, cluster middleware 122, applications 123, database 124, and cluster data collection module 125. Operating system 120 may be any operating system. For example, in certain embodiments, operating system 120 may be any preemptive multi-tasking operating system that permits networked file locking, such as, BeOS, MPE/iX, UNIX, and variants of UNIX, such as AIX, BSD, LINUX, SCO UNIX, SOLARIS, SunOS, HP-UX and ULTRIX. In other embodiments, operating system 120 may be an operating system such as OS/2, WINDOWS, or WINDOWS NT.

Cluster middleware 122 may be any middleware layer that resides between operating system 120 and applications 123. Cluster middleware 122 provides what is referred to in the art as a Single System Image (SSI) of cluster computer system 100. In general, cluster middleware 122 glues together operating systems 120 on all nodes 104 in cluster computer system 100 to offer unified access to applications 123. As known in the art, cluster middleware 122 may provide any of the following, and other, cluster services: checkpointing, automatic failover, recovery from failure, and fault-tolerant support among all nodes 104. In a preferred embodiment, cluster middleware 122 is HEWLETT PACKARD'S "Multi-computer SERVICEGUARD." In other embodiments, cluster middleware 122 may be BEOWULF for LINUX, MICROSOFT cluster server (referred to as WOLFPACK) for WINDOWS or WINDOWS NT, or any other cluster middleware for providing any of a variety of cluster services.

As stated above, applications 123 may comprise at least one parallel application, which may be any mission-critical or time-critical computer application that needs to be reliably provided to all nodes 104 and clients 108 in cluster computer system 100, such as, APACHE Web Server, ORACLE Parallel Server Database, PEOPLESOFT Human Resource Management Software, and SAP Supply Chain Management Software to name a few. Applications 123 may also comprise any of a number of scalar computer applications that operate independently of cluster middleware 122.

As one of ordinary skill in the art understands, there are numerous embodiments for cluster computer system 100. For example, depending on the specific implementation of cluster computer system 100, nodes 104 may include multiple CPUs 110, multiple I/O devices 118, multiple interface cards 116, multiple storage devices 119, or other components not illustrated in FIG. 1.

As illustrated in FIG. 1, cluster computer system 100 may be connected to automated cluster audit system 102 via public or private packet-switched or other data networks including the Internet, circuit switched networks such as the public switched telephone network, wireless networks, or any other desired communications infrastructure 126.

II. System Components and Operation

Figure 2:
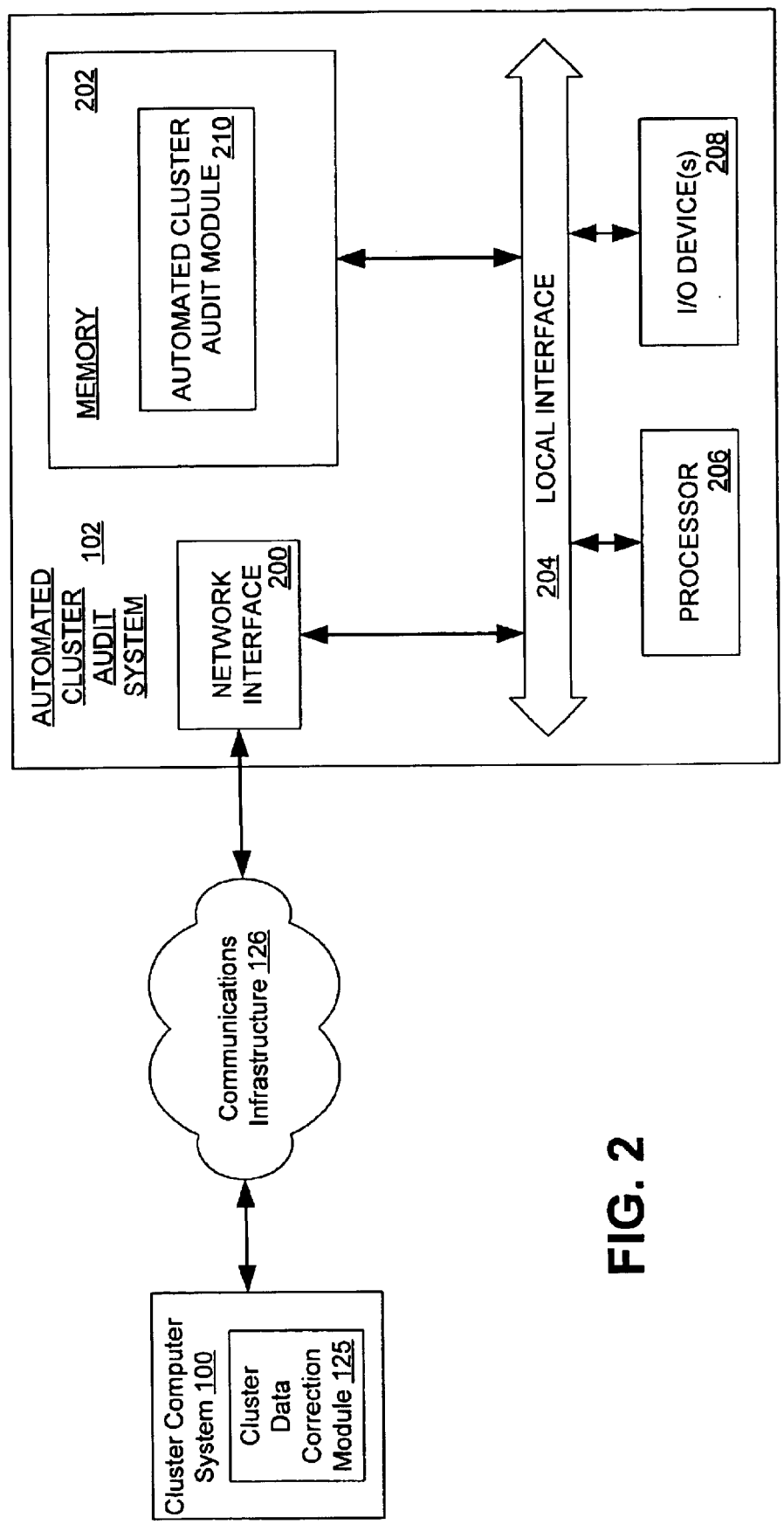
FIG. 2 is a block diagram of the automated cluster audit system of FIG. 1.

FIG. 2 illustrates a block diagram of cluster computer system 100 and automated cluster audit system 102 of FIG. 1. Automated cluster audit system 102 may generally comprise a network interface 200, memory 202, local interface 204, a processor 206, and I/O device(s) 208. Network interface 200 communicates with communication infrastructure 126 and local interface 204. As known by those of ordinary skill in the art, network interface 200 may be implemented in any of a variety of ways depending on the configuration of communications infrastructure 126 and cluster computer system 100. Local interface 204 also connects memory 202, processor 206, and I/O device(s) 208. Memory 202 includes automated cluster audit module 210.

Figure 3:
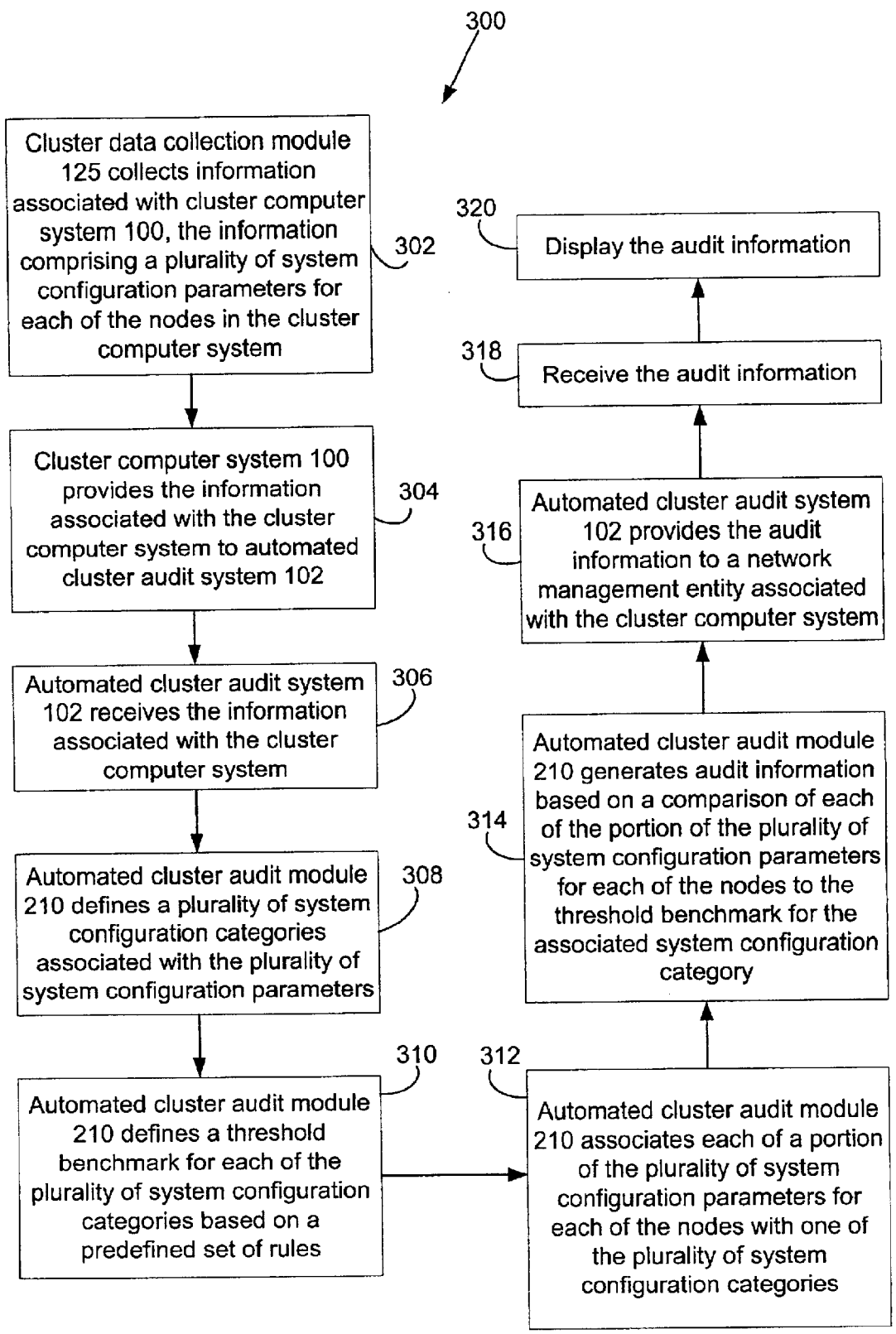
FIG. 3 is a flow chart illustrating the general operation of, and interaction between, the automated cluster audit system and cluster computer system of FIGS. 1 and 2.

FIG. 3 is a flow chart 300 illustrating the general operation of, and interaction between, automated cluster audit system 102 and cluster computer system 100 of FIGS. 1 and 2. At block 302, cluster data collection module 125 collects information associated with cluster computer system 100. The information may comprise a plurality of system configuration parameters for each node 104 in cluster computer system 100. In general, the system configuration parameters define a snapshot of the configuration of each node 104. For example, the system configuration parameters may include information related to CPU 110, operating system 120, cluster middleware 122, applications 123, database 124, network interface card(s) 116, I/O device(s) 118, clients 108, storage device(s) 119, or any other desirable parameter related to the system configuration of node 104.

Unlike existing prior art cluster data collection tools, which focus on maximizing computing efficiency by eliminating redundancy, cluster data collection module 125 may be configured to provide redundant data collection. For instance, cluster data collection module 125 may employ an aggregation of known cluster data collection tools, such as commercial off-the-shelf (COTS) tools, proprietary data collection tools, or any other data collection tool, to collect the information associated with cluster computer system 100. In a preferred embodiment, cluster data collection module 125 may be configured so that the aggregated list of collectible items includes redundant items. For example, one known data collection tool may collect system configuration parameters A, B, C, and D, and another known data collection tool may collect system configuration parameters B, C, D, E, and F. In this manner, cluster data collection module 125 may redundantly collect and record system configuration parameters B, C, and D. This enables automated cluster audit system 102 to employ error correction techniques for the redundant system configuration parameters. Therefore, if there is a failure or an error with respect to system configuration parameter B that is collected by the first data collection tool, the system configuration parameter B collected by the second data collection tool may be used by automated cluster audit system 102 to provide a more reliable diagnostic audit.

At block 302, cluster data collection module 125 collects information associated with cluster computer system 100. The information may comprise a plurality of system configuration parameters for each node 104 in cluster computer system 100. In general, the system configuration parameters define a snapshot of the configuration of each node 104. For example, the system configuration parameters may include information related to CPU 110, operating system 120, cluster middleware 122, applications 123, database 124, network interface card(s) 116, I/O device(s) 118, clients 108, storage device(s) 119, or any other desirable parameter related to the system configuration of node 104.

After collecting the information, at block 304, cluster computer system 100 may provide the information to automated cluster audit system 102 via communications infrastructure 126. The information exchange between cluster computer system 100 and automated cluster audit system 102 may be done in a variety of ways. For example, the information may be provided to automated cluster audit system 102 via electronic mail or any other transport media, such as, file transfer protocol (FTP), hypertext transfer protocol (HTTP), or any other protocol. In certain embodiments, the information exchange between cluster computer system 100 and automated cluster audit system 102 is performed as disclosed in U.S. Pat. No. 6,192,410 B1 to Miller et al., which is hereby incorporated by reference in its entirety.

After receiving the information at block 306, automated cluster audit system 102 may perform a variety of functions in order to provide an automated diagnostic audit of the information received from cluster computer system 100. At block 308, automated cluster audit module 210 may define a plurality of system configuration categories associated with the plurality of system configuration parameters for each node 104 of cluster computer system 100.

At block 310, automated cluster audit module 210 may also define a threshold benchmark for each of the plurality of system configuration categories based on a predefined set of rules. For example, the threshold benchmarks may be normalized thresholds or fixed thresholds that incorporate a relative ranking process. Where normalized thresholds are implemented, the threshold benchmarks may be defined using a predefined rule that oversees the relative ranking process on a distribution of historical peer-to-peer data. The historical peer-to-peer data may be generated by automated cluster audit system 102. It may also be generated by an external system and provided to automated cluster audit system 102.

Regardless of how the data is generated, in certain embodiments, the central ranking distribution system enables automated cluster audit module 210 to adjust the threshold benchmarks. This process of relying upon a central predetermined ranking distribution system for adjusting thresholds overcomes various problems. For example, absolute fixed thresholds are subject to an unpredictable number of unmanaged or ad hoc number of false negatives and false positives. Assuming the benchmarks or heuristic measures are correct, a fixed ranking distribution will produce a controlled percentage of alarms within a fixed population that address the correct categories. Absolute thresholds that are dynamically adjusted with local standards tend to produce confusing results unless time series data samples are gathered over a period of time so that baselining is possible. Manually adjustable thresholds require significant attentive human operator labor to calibrate thresholds to arbitrary values.

Furthermore, at block 312, automated cluster audit module 210 may associate each of a portion of the plurality of system configuration parameters for each node 104 with one of the plurality of system configuration categories. At block 314, audit information is generated based on a comparison of each of the portion of the plurality of system configuration parameters for each node 104 to the threshold benchmark for the associated system configuration category. At block 316, automated cluster audit system 102 may provide the audit information to a network management entity, or similar entity, associated with cluster computer system 100. After receiving the audit information at 318, cluster computer system 100 may then display the audit information at block 320.

It should be understood by those of ordinary in the art that there are numerous ways to implement automated cluster audit system 102. For instance, as illustrated in FIGS. 1 and 2, automated cluster audit system 102 may be leveraged in an application service provider (ASP) environment. In these embodiments, cluster computer systems 100 may subscribe to the services provided by automated cluster audit system 102. In this manner, information associated with a cluster computer system 100, such as described above, may be periodically provided to automated cluster audit system 102 when a diagnostic audit is desired. In response to the request for a diagnostic audit, automated cluster audit system 102 may then provide the diagnostic information. The diagnostic information may be provided directly to cluster computer system 100 or to some network management entity, or similar entity, affiliated with cluster computer system 100.

In alternative embodiments, automated cluster audit system 102 may be integrated with cluster data collection module 125 in cluster computer systems 100. In these embodiments, instead of providing the information associated with cluster computer system 100 to an external system, the functionality of automated cluster audit system 100 and automated cluster audit module 210 may be included within cluster computer system 100. For example, the functionality of automated cluster audit system 100 and automated cluster audit module 210 may be implemented in memory 112, or some other memory, in nodes 104 and performed by CPU 110. Although cluster data collection module 125 and automated cluster audit module 210 may be employed in all of these, and other possible embodiments, for clarity they will be described with reference to FIGS. 1 and 2.

Figure 4:
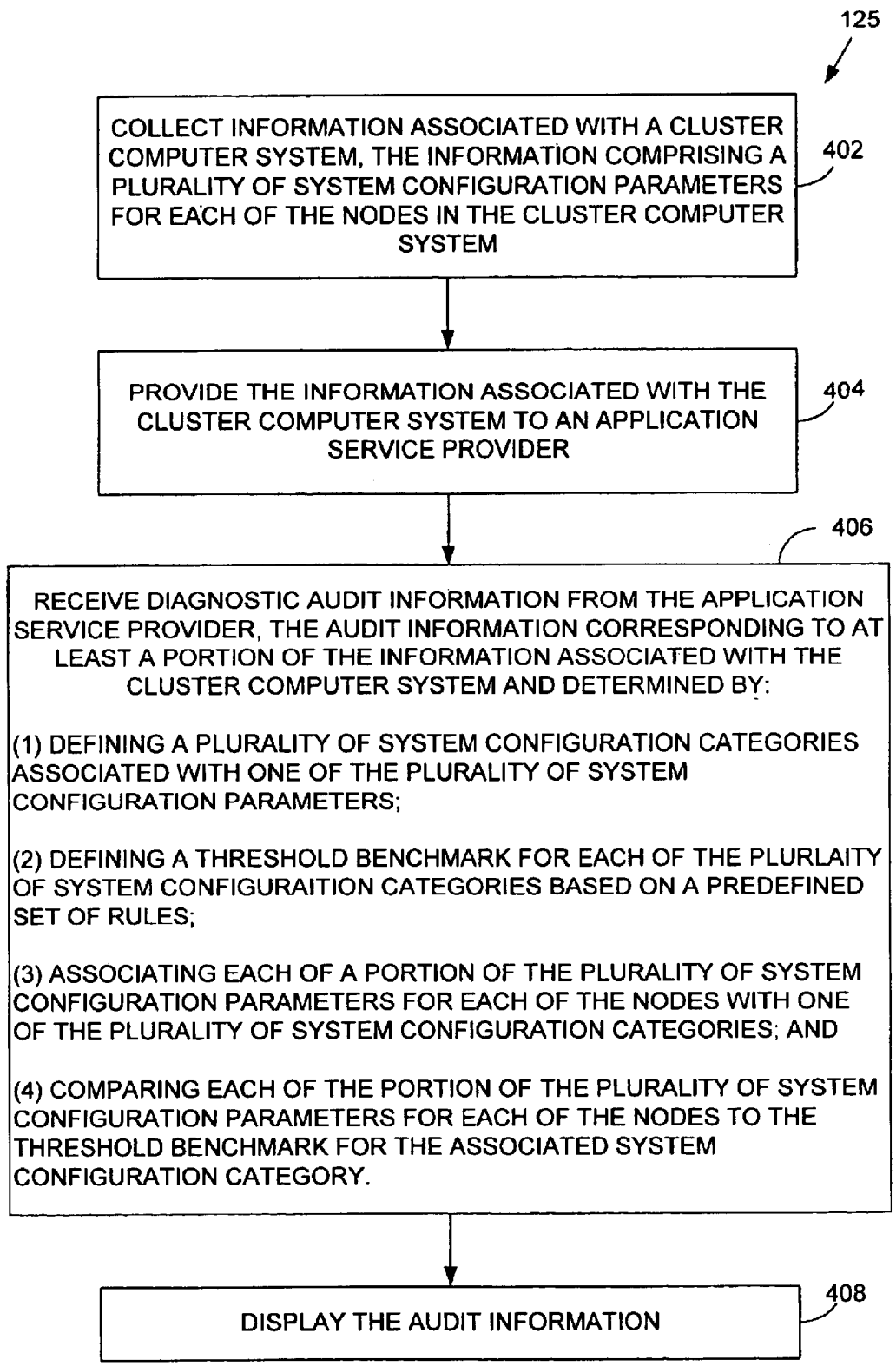
FIG. 4 is a flow chart illustrating the architecture, operation, and functionality of one of a number of possible embodiments of the cluster data collection module of FIGS. 1 and 2.

FIG. 4 is a flow chart illustrating the architecture, operation, and functionality of cluster data collection module 125 of FIGS. 1 and 2. At block 402, cluster data collection module 125 collects information associated with cluster computer system 100. The information may comprise a plurality of system configuration parameters for each node 104 in cluster computer system 100. In general, the system configuration parameters define a snapshot of the configuration of each node 104. For example, the system configuration parameters may include information related to CPU 110, operating system 120, cluster middleware 122, applications 123, database 124, network interface card(s) 116, I/O device(s) 118, clients 108, storage device(s) 119, or any other desirable parameter related to the system configuration of node 104.

Unlike existing prior art cluster data collection tools, which focus on maximizing computing efficiency by eliminating redundancy, cluster data collection module 125 may be configured to provide redundant data collection. For instance, cluster data collection module 125 may employ an aggregation of known cluster data collection tools, such as commercial off-the-shelf (COTS) tools, proprietary data collection tools, or any other data collection tool, to collect the information associated with cluster computer system 100. In a preferred embodiment, cluster data collection module 125 may be configured so that the aggregated list of collectible items includes redundant items. For example, one known data collection tool may collect system configuration parameters A, B, C, and D, and another known data collection tool may collect system configuration parameters B, C, D, E, and F. In this manner, cluster data collection module 125 may redundantly collect and record system configuration parameters B, C, and D. This enables automated cluster audit system 102 to employ error correction techniques for the redundant system configuration parameters. Therefore, if there is a failure or an error with respect to system configuration parameter B that is collected by the first data collection tool, the system configuration parameter B collected by the second data collection tool may be used by automated cluster audit system 102 to provide a more reliable diagnostic audit.

At block 404, cluster data collection module 125 provides the information associated with cluster computer system 100 to automated cluster audit system 102 via communications infrastructure 126. The information associated with cluster computer system 100 may be provided to automated cluster audit system 102 in a variety of ways. For example, the information may be provided to automated cluster audit system 102 via electronic mail or any other transport media, such as, file transfer protocol (FTP), hypertext transfer protocol (HTTP), or any other protocol. In certain embodiments, the information associated with cluster computer system 100 may be provided to automated cluster audit system 102 in the manner disclosed in U.S. Pat. No. 6,192, 410 B1 to Miller et al.

At block 406, cluster data collection module 125 receives diagnostic audit information related to the information associated with cluster computer system 100 that is provided to automated cluster audit system 102. The diagnostic audit information corresponds to at least a portion of the information associated with the cluster computer system 100. Furthermore, the diagnostic audit information may be determined by (1) defining a plurality of system configuration categories associated with the plurality of system configuration parameters, (2) defining a threshold benchmark for each of the plurality of system configuration categories based on predefined set of rules, (3) associating each of a portion of the plurality of system configuration parameters for each node 104 with one of the plurality of system configuration categories, and (4) comparing each of the portion of the plurality of system configuration parameters for each node 104 to the threshold benchmark for the associated system configuration category. At block 408, cluster data collection module 125 displays the diagnostic audit information.

Cluster data collection module 125 may be implemented in hardware, software, firmware, or a combination thereof. As illustrated in FIG. 1, in one of a number of possible embodiments, cluster data collection module 125 is implemented in software or firmware that is stored in memory and that is executed by processor or any other suitable instruction execution system. If implemented in hardware, as in alternative embodiments, cluster data collection module 125 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

FIG. 5 illustrates one of a number of possible embodiments of a cluster audit display 500 generated by cluster data collection module 125 from the diagnostic audit information provided by automated cluster audit system 102. Cluster audit display 500 is a table that includes a Node Name column 502. Column 502 lists vertically each node 104 in cluster computer system 100. Cluster audit display 500 also includes a CPU column 504, a RAM column 506, a Swap column 508, a Disk column 510, a Network Card column 512, an Operating System column 514, a Patch column 516, an Apps column 518, a Users column 520, and a Cluster S/W column 522. Columns 504, 506, 508, 510, 512, 514, 516, 518, 520, and 522 correspond to the system configuration categories defined by automated audit cluster system 102 (block 308, FIG. 3 and block 602, FIG. 6). Thus, audit information for each node 104 may be viewed horizontally across the corresponding row. In this manner, the diagnostic metrics for each node 104 in cluster computer system 100 may be sorted, for example, horizontally along a hierarchical scale such that each node 104 within cluster computer system 100 can be compared to every other node 104 in cluster computer system 100.

Furthermore, cluster audit display 500 may also present the sorted diagnostic metrics for cluster computer system 100 in the form of a comparison against threshold benchmarks for each of the system configuration categories. The threshold benchmarks may be defined by automated cluster audit system 102 based on a predefined set of rules (block 310, FIG. 3 and block 604, FIG. 6). In certain embodiments, the predefined set of rules may comprise various heuristic formulas related to each system configuration category.

For example, referring again to FIG. 5, the threshold benchmarks for the system configuration category associated with CPU column 504 may be defined based on predefined rules related to, for example, processor frequency, processor utilization, hardware architecture, estimated instructions per cycle, and any other desirable variable. The threshold benchmarks for the system configuration category associated with Disk column 510 may be defined based on predefined rules related to, for example, shared drive configurations, appropriate redundant array of inexpensive disks (RAID) settings, multiple disk controller cards, or any other desirable variable. The threshold benchmarks for the system configuration category associated with Net Card column 512 may be defined based on predefined rules related to, for example, network interface cards or any other desirable variable. The threshold benchmarks for the system configuration category associated with O/S Rev column 514 may incorporate major (integer) and minor (fractional) variances in the O/S release number and O/S word length or bit width variances associated with operating system 120. For example, the predefined rules may convert alphabetical characters with rightmost characters in a finite version string into an arbitrary precision number. The predefined rules may transform the most significant digits on the left and leftmost characters into least significant digits. In this manner, nodes 104 with an operating system 120 having an integer difference in the release number may be associated with one conformance state, such as, "Issue." Nodes 104 with an operating system 120 having a fractional difference in the release number may be associated with another conformance state, such as, "Warning."

Furthermore, the threshold benchmarks for the system configuration category associated with Patch column 516 may be defined based on predefined rules related to, for example, service packs, patches, patch bundles, service modifications, bug fix changes, or any other desirable variable. The threshold benchmarks for the system configuration category associated with Apps column 518 may be defined based on predefined rules which incorporate a list of applications that are known to impair the reliability of a computer. This list of applications may be included in a defect tracking database. The threshold benchmarks for the system configuration category associated with Cluster S/W column 522 may be defined based on predefined rules related to any of a variety of variables. For example, automated cluster audit module 210 may verify the installation and configuration of cluster middleware 122 settings, test the version numbers for cluster middleware 122, and check the operation status of each cluster middleware setting with the context of the cluster.

The predefined set of rules may also comprise statistical segmentation guidelines for determining various conformance states. Automated cluster audit system 102 compares the system configuration parameters for each node 104 to the threshold benchmarks for the associated system configuration category. Based on this comparison, automated cluster audit system 102 may associate the value of the system configuration category in display screen 500 with one of a plurality of conformance states. For instance, as illustrated in FIG. 5, CPU column 504, RAM column 506, Swap column 508, Disk column 510, Network Card column 512, Operating System column 514, Patch column 516, Apps column 518, Users column 520, and Cluster S/W column 522 may be presented in red with text designating "Issue," in situations where automated audit cluster system 102 identifies a significant asymmetry for a particular node 104 in relation to the other nodes 104. CPU column 504, RAM column 506, Swap column 508, Disk column 510, Network Card column 512, Operating System column 514, Patch column 516, Apps column 518, Users column 520, and Cluster S/W column 522 may be presented in yellow with the text designating "Warning," in situations where automated audit cluster system 102 identifies there is a potential issue with a node 104 that is worthy of closer examination. CPU column 504, RAM column 506, Swap column 508, Disk column 510, Network Card column 512, Operating System column 514, Patch column 516, Apps column 518, Users column 520, and Cluster S/W column 522 may be presented in green with the text designating "Conforms," in situations where automated audit cluster system 102 identifies that there is internal symmetry for a node 104 or conformity to a predefined set of rules. CPU column 504, RAM column 506, Swap column 508, Disk column 510, Network Card column 512, Operating System column 514, Patch column 516, Apps column 518, Users column 520, and Cluster S/W column 522 may be presented in white with the text designating "Unknown," in situations where automated audit cluster system 102 identifies there is a potential issue with a node 104 that is worthy of closer examination.

Figure 6:
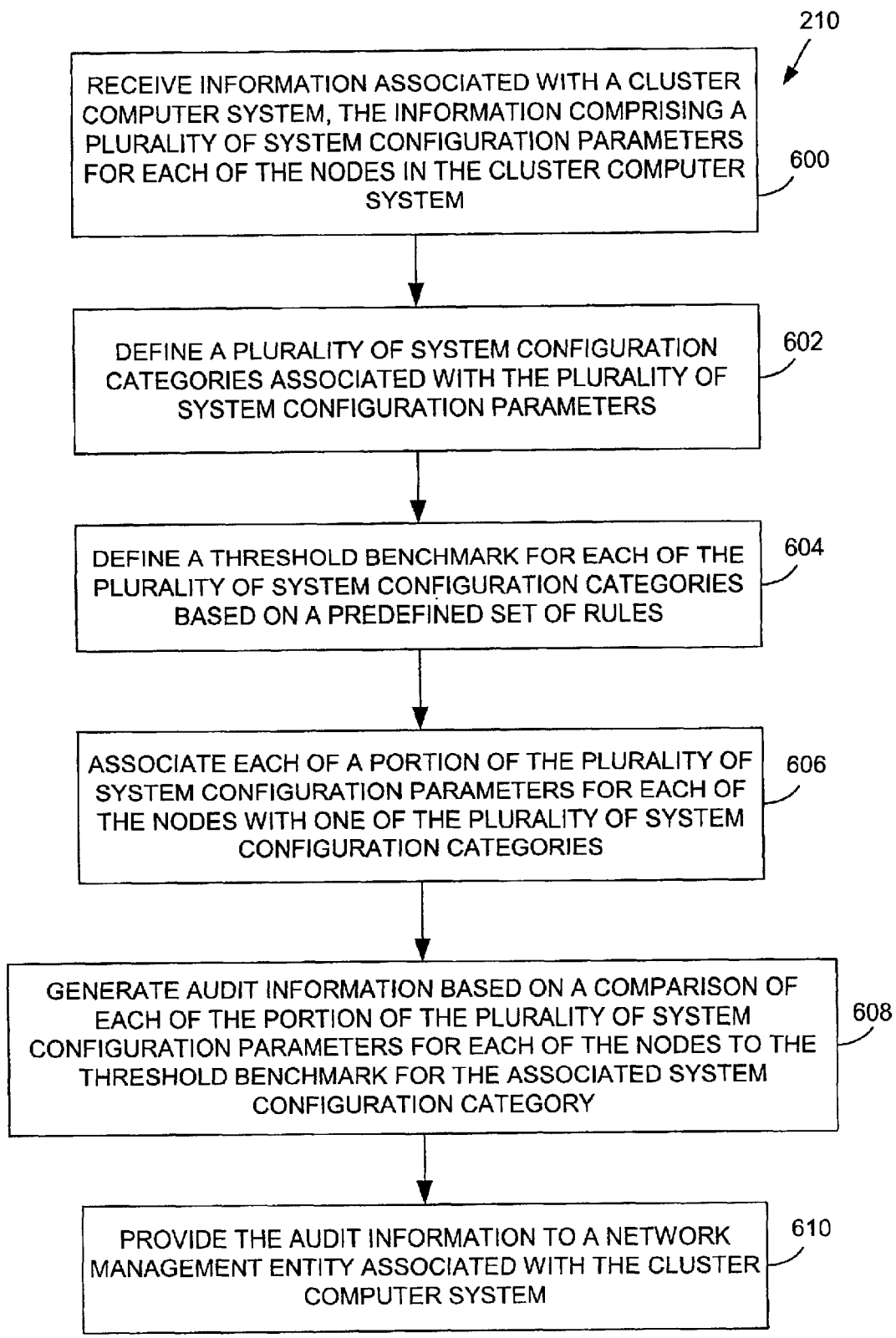
FIG. 6 is a flow chart illustrating the architecture, operation, and functionality of one of a number of possible embodiments of the automated cluster audit module of FIGS. 1 and 2.

FIG. 6 is a flow chart illustrating the architecture, operation, and functionality of automated cluster audit module 210 of FIGS. 1 and 2. At block 600, automated cluster audit system 102 receives information associated with cluster computer system 100. The information may comprise a plurality of system configuration parameters for each node 104 in cluster computer system 100. In general, the system configuration parameters define a snapshot of the configuration of each node 104. For example, the system configuration parameters may include information related to CPU 110, operating system 120, cluster middleware 122, applications 123, disk 124, network interface card(s) 116, I/O device(s) 118, terminals 108, or any other desirable parameter related to the system configuration of node 104.

At block 602, automated cluster audit system 102 defines a plurality of system configuration categories associated with the plurality of system configuration parameters. In one of many possible embodiments, the system configuration categories are defined based on the system configuration parameters that most directly affect the performance of cluster computer system 100. For example, the system configuration categories may include any of the following categories illustrated in cluster audit display 500 of FIG. 5: a central processing unit parameter associated with CPU 110, a random access memory (RAM) parameter associated with RAM (not shown in FIG. 1) in nodes 104, a virtual memory parameter associated with virtual memory, or swap, (not shown in FIG. 1) in nodes 104, a disk parameter associated with disk 124, a network card parameter associated with network card(s) 116, an operating system parameter associated with operating system 120, a patch parameter associated with operating system 120, an applications parameter associated with applications 123, a user parameter associated with clients 108, a cluster middleware parameter associated with cluster middleware 122, or any other desirable parameter associated the various components of nodes 104.

At block 604, threshold benchmarks are defined for each of the plurality of system configuration categories based on a predefined set of rules. As mentioned above with respect to FIG. 3, the threshold benchmarks may be normalized thresholds or fixed thresholds that incorporate a relative ranking process. Where normalized thresholds are implemented, the threshold benchmarks may be defined using a predefined rule that oversees the relative ranking process on a distribution of historical peer-to-peer data. The historical peer-to-peer data may be generated by automated cluster audit system 102. It may also be generated by an external system and provided to automated cluster audit system 102.

As stated above, in certain embodiments, the central ranking distribution system enables automated cluster audit module 210 to adjust the threshold benchmarks. This process of relying upon a central predetermined ranking distribution system for adjusting thresholds overcomes various problems. For example, absolute fixed thresholds are subject to an unpredictable number of unmanaged or ad hoc number of false negatives and false positives. Assuming the benchmarks or heuristic measures are correct, a fixed ranking distribution will produce a controlled percentage of alarms within a fixed population that address the correct categories. Absolute thresholds that are dynamically adjusted with local standards tend to produce confusing results unless time series data samples are gathered over a period of time so that baselining is possible. Manually adjustable thresholds require significant attentive human operator labor to calibrate thresholds to arbitrary values.

A block 606, automated cluster audit system 102 associates each of a portion of the plurality of system configuration parameters for each node 104 with one of the plurality of system configuration categories. At block 608, automated cluster audit system 102 generates audit information based on a comparison of each of the portion of the plurality of system configuration parameters for each node 104 to the threshold benchmark for the associated system configuration category. In situations where the threshold benchmarks incorporate a relative ranking process as illustrated in FIG. 5, the audit information is generated based on a comparison of each of the portion of the plurality of system configuration parameters for each node 104 to the threshold benchmarks for the associated system configuration category At block 610, automated cluster audit system 102 provides the audit information to a network management entity, or similar entity, associated with cluster computer system 100. As described above, the audit information may be provided to cluster computer system 100 and presented in a number of ways. In this regard, automated cluster audit module 210 may configure the audit information in a variety of ways to enable various presentations. In certain embodiments, automated cluster audit module 210 may configure the audit information in such a way that it may subsequently be presented as cluster audit display 500 of FIG. 5.

Automated cluster audit module 210 may be implemented in hardware, software, firmware, or a combination thereof. As illustrated in FIG. 2, in one of a number of possible embodiments, automated cluster audit module 210 is implemented in software or firmware that is stored in memory and that is executed by processor or any other suitable instruction execution system. If implemented in hardware, as in alternative embodiments, automated cluster audit module 210 may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in FIGS. 3, 4, and 6 should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art.

In addition, automated cluster audit module 210 and cluster data collection module 125, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of cluster data collection module 125 and automated cluster audit module 210, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and protected by the following claims.

Therefore, having thus described the invention, at least the following is claimed:

1. A method for providing an automated diagnostic audit for a cluster computer system, the cluster computer system comprising a plurality of nodes, each node of the plurality of nodes providing a mission-critical application to a plurality of clients, the method comprising:
    receiving information associated with the cluster computer system, the information comprising a plurality of system configuration parameters for each node of the plurality of nodes in the cluster computer system;
    defining a plurality of system configuration categories associated with the plurality of system configuration parameters;
    defining a threshold benchmark for each system configuration category of the plurality of system configuration categories, each threshold benchmark of a plurality of threshold benchmarks based on a predefined set of rules; associating each of a portion of the plurality of system configuration parameters for each node of the plurality of nodes with one of the plurality of system configuration categories; and
    generating audit information, the audit information based on a comparison of each of the portion of the plurality of system configuration parameters for each node of the plurality of nodes to the threshold benchmark for the associated system configuration category.

2. The method of claim 1, wherein each of at least a portion of the plurality of system configuration parameters are redundantly collected.

3. The method of claim 1, further comprising providing the audit information to a network management entity associated with the cluster computer system.

4. The method of claim 3, wherein the audit information provided to the network management entity is configured to be presented on a graphical user interface.

5. The method of claim 3, wherein the receiving the information associated with the cluster computer system and the providing the audit information are via a communications network.

6. The method of claim 3, further comprising receiving payment for providing the audit information.

7. The method of claim 1, wherein the plurality of system configuration comprise a processing parameter, a storage parameter, a network parameter, an operating system parameter, an applications parameter, and a user parameter.

8. The method of claim 1, wherein the plurality of system configuration categories comprise a processing parameter, a random access memory (RAM) parameter, a virtual memory parameter, a disk storage parameter, a network parameter, an operating system parameter, an applications parameter, and a user parameter.

9. The method of claim 1, wherein the plurality of threshold benchmarks involve a relative ranking process.

10. The method of claim 1, wherein the plurality of threshold benchmarks are normalized thresholds based on a distribution of historical data.

11. A system for providing an automated diagnostic audit for a cluster computer system, the cluster computer system comprising a plurality of nodes, each node of the plurality of nodes providing a mission-critical application to a plurality of clients, the system comprising:
    means for receiving information associated with the cluster computer system, the information comprising a plurality of system configuration parameters for each node of the plurality of nodes in the cluster computer system;
    means for defining a plurality of system configuration categories associated with the plurality of system configuration parameters;
    means for defining a threshold benchmark for each system configuration category of the plurality of system configuration categories, each threshold benchmark of a plurality of threshold benchmarks based on a predefined set of rules;
    means for associating each of a portion of the plurality of system configuration parameters for each node of the plurality of nodes with one of the plurality of system configuration categories; and
    means for generating audit information, the audit information based on a comparison of each of the portion of the plurality of system configuration parameters for each node of the plurality of nodes to the threshold benchmark for the associated system configuration category.

12. The system of claim 11, wherein each of at least a portion of the plurality of system configuration parameters are redundantly collected.

13. The system of claim 11, further comprising means for providing the audit information to a network management entity associated with the cluster computer system.

14. The system of claim 13, further comprising means for receiving payment for providing the audit information.

15. The system of claim 11, wherein the plurality of system configuration categories comprise a processing parameter, a storage parameter, a network parameter, an operating system parameter, an applications parameter, and a user parameter.

16. The system of claim 11, wherein the plurality of system configuration categories comprise a processing parameter, a random access memory (RAM) parameter, a virtual memory parameter, a disk storage parameter, a network parameter, an operating system parameter, an applications parameter, and a user parameter.

17. The system of claim 11, wherein the audit information provided to a network management entity is configured to be presented on a graphical user interface.

18. The system of claim 11, wherein the receiving the information associated with the cluster computer system and the generating the audit information are via a communications network.

19. The system of claim 11, wherein the plurality of threshold benchmarks involve a relative ranking process.

20. The system of claim 11, wherein the plurality of threshold benchmarks are normalized thresholds based on a distribution of historical data.

21. A computer-readable medium comprising a program for providing an automated diagnostic audit for a cluster computer system, the cluster computer system comprising a plurality of nodes, each node of the plurality of nodes providing a mission-critical application to a plurality of clients, the program comprising:

a first portion of logic configured to receive information associated with the cluster computer system, the information comprising a plurality of system configuration parameters for each node of the plurality of nodes in the cluster computer system;

a second portion of logic configured to define a plurality of system configuration categories associated with the plurality of system configuration parameters;

a third portion of logic configured to define a threshold benchmark for each system configuration category of the plurality of system configuration categories, each threshold benchmark of a plurality of threshold benchmarks based on a predefined set of rules;

a fourth portion of logic configured to associate each of a portion of the plurality of system configuration parameters for each node of the plurality of nodes with one of the plurality of system configuration categories; and a fifth portion of logic configured to generate audit information, the audit information based on a comparison of each of the portion of the plurality of system configuration parameters for each node of the plurality of nodes to the threshold benchmark for the associated system configuration category.

22. The computer-readable medium of claim 21, wherein each of at least a portion of the plurality of system configuration parameters are redundantly collected.

23. The computer-readable medium of claim 21, further comprising a sixth portion of logic configured to provide the audit information to a network management entity associated with the cluster computer system.

24. The computer-readable medium of claim 23, wherein the audit information provided to the network management entity is configured to be presented on a graphical user interface.

25. The computer-readable medium of claim 23, wherein the receiving the information associated with the cluster computer system and the generation the audit information are via a communications network.

26. The computer-readable medium of claim 23, further comprising a seventh portion of logic configured to receive payment for providing the audit information.

27. The computer-readable medium of claim 21, wherein the plurality of system configuration categories comprise a processing parameter, a storage parameter, a network parameter, an operating system parameter, an applications parameter, and a user parameter.

28. The computer-readable medium of claim 21, wherein the plurality of system configuration categories comprise a processing parameter, a random access memory (RAM) parameter, a virtual memory parameter, a disk storage parameter, a network parameter, an operating system parameter, an applications parameter, and a user parameter.

29. The computer-readable medium of claim 21, wherein the plurality of threshold benchmarks involve a relative ranking process.

30. The computer-readable medium of claim 21, wherein the plurality of threshold benchmarks are normalized thresholds based on a distribution of historical data.

31. A method for providing an automated diagnostic audit for a cluster computer system, the cluster computer system comprising a plurality of nodes, each node of the plurality of nodes providing a mission-critical application to a plurality of clients, the method comprising:

collecting information associated with the cluster computer system, the information comprising a plurality of system configuration parameters for each node of the plurality of nodes in the cluster computer system;

providing the information associated with the cluster computer system to an application service provider; and receiving diagnostic audit information generated by the application service provider, the diagnostic audit information corresponding to at least a portion of the information associated with the cluster computer system and determined by:

defining a plurality of system configuration categories associated with the plurality of system configuration parameters;

defining a threshold benchmark for each system configuration category of the plurality of system configuration categories, each threshold benchmark of a plurality of threshold benchmarks based on a predefined set of rules;

associating each of a portion of the plurality of system configuration parameters for each node of the plurality of nodes with one of the plurality of system configuration categories; and comparing each of the portion of the plurality of system configuration parameters for each node of the plurality of nodes to the threshold benchmark for the associated system configuration category.

32. The method of claim 31, wherein each of at least a portion of the plurality of system configuration parameters are redundantly collected.

33. The method of claim 31, wherein the plurality of system configuration categories comprise a processing parameter, a storage parameter, a network parameter, an operating system parameter, an applications parameter, and a user parameter.

34. The method of claim 31, wherein the plurality of system configuration categories comprise a processing parameter, a random access memory (RAM) parameter, a virtual memory parameter, a disk storage parameter, a network parameter, an operating system parameter, an applications parameter, and a user parameter.

35. The method of claim 31, wherein the plurality of threshold benchmarks involve a relative ranking process.

36. The method of claim 31, wherein the plurality of threshold benchmarks are normalized thresholds based on a distribution of historical data.

37. The method of claim 31, further comprising presenting the audit information on a graphical user interface.

38. The method of claim 31, wherein the providing the information associated with the cluster computer system to an application service provider is via electronic mail.

39. The method of claim 31, wherein the providing the information associated with the cluster computer system to an application service provider is via the Internet.

40. The method of claim 31, further comprising paying for the diagnostic audit information.

41. A system for providing an automated diagnostic audit for a cluster computer system, the cluster computer system comprising a plurality of nodes, each node of the plurality of nodes providing a mission-critical application to a plurality of clients, the system comprising:

means for collecting information associated with the cluster computer system, the information comprising a plurality of system configuration parameters for each node of the plurality of nodes in the cluster computer system;

means for providing the information associated with the cluster computer system to an application service provider; and means for receiving diagnostic audit information generated by the application service provider, the diagnostic audit information corresponding to at least a portion of the information associated with the cluster computer system and determined by:

defining a plurality of system configuration categories associated with the plurality of system configuration parameters;

defining a threshold benchmark for each system configuration category of the plurality of system configuration categories, each threshold benchmark of a plurality of threshold benchmarks based on a predefined set of rules;

associating each of a portion of the plurality of system configuration parameters for each node of the plurality of nodes with one of the plurality of system configuration categories; and comparing each of the portion of the plurality of system configuration parameters for each node of the plurality of nodes to the threshold benchmark for the associated system configuration category.

42. The system of claim 41, wherein each of at least a portion of the plurality of system configuration parameters are redundantly collected.

43. The system of claim 41, wherein the plurality of system configuration categories comprise a processing parameter, a storage parameter, a network parameter, an operating system parameter, an applications parameter, and a user parameter.

44. The system of claim 41, wherein the plurality of system configuration categories comprise a processing parameter, a random access memory (RAM) parameter, a virtual memory parameter, a disk storage parameter, a network parameter, an operating system parameter, an applications parameter, and a user parameter.

45. The system of claim 41, wherein the plurality of threshold benchmarks involve a relative ranking process.

46. The system of claim 41, wherein the plurality of threshold benchmarks are normalized thresholds based on a distribution of historical data.

47. The system of claim 41, further comprising means for presenting the audit information on a graphical user interface.

48. The system of claim 41, wherein the information associated with the cluster computer system is provided to the application service provider via electronic mail.

49. The system of claim 41, wherein the information associated with the cluster computer system is provided to the application service provider via the Internet.

50. The system of claim 41, further comprising paying for the diagnostic audit information.

51. A computer-readable medium comprising a program for providing an automated diagnostic audit for a cluster computer system, the cluster computer system comprising a plurality of nodes, each of the plurality of nodes providing a mission-critical application to a plurality of clients, the program comprising:

a first portion of logic configured to collect information associated with the cluster computer system, the information comprising a plurality of system configuration parameters for each node of the plurality of nodes in the cluster computer system;

a second portion of logic configured to provide the information associated with the cluster computer system to an application service provider; and a third portion of logic configured to receive diagnostic audit information generated by the application service provider, the diagnostic audit information corresponding to at least a portion of the information associated with the cluster computer system and determined by:

defining a plurality of system configuration categories associated with the plurality of system configuration parameters;

defining a threshold benchmark for each system configuration category of the plurality of system configuration categories, each threshold benchmark of a plurality of threshold benchmarks based on a predefined set of rules;

associating each of a portion of the plurality of system configuration parameters for each node of the plurality of nodes with one of the plurality of system configuration categories; and comparing each of the portion of the plurality of system configuration parameters for each node of the plurality of nodes to the threshold benchmark for the associated system configuration category.

52. The computer-readable medium of claim 51, wherein each of at least a portion of the plurality of system configuration parameters are redundantly collected.

53. The computer-readable medium of claim 51, wherein the plurality of system configuration categories comprise a processing parameter, a storage parameter, a network parameter, an operating system parameter, an applications parameter, and a user parameter.

54. The computer-readable medium of claim 51, wherein the plurality of system configuration categories comprise a processing parameter, a random access memory (RAM) parameter, a virtual memory parameter, a disk storage parameter, a network parameter, an operating system parameter, an applications parameter, and a user parameter.

55. The computer-readable medium of claim 51, wherein the plurality of threshold benchmarks involve a relative ranking process.

56. The computer-readable medium of claim 51, wherein the plurality of threshold benchmarks are normalized thresholds based on a distribution of historical data.

57. The computer-readable medium of claim 51, further comprising a fourth portion of logic configured to present the audit information on a graphical user interface.

58. The computer-readable medium of claim 51, wherein the information associated with the cluster computer system is provided to the application service provider via electronic mail.

59. The computer-readable medium of claim 51, wherein the information associated with the cluster computer system is provided to the application service provider via the Internet.

60. The computer-readable medium of claim 51, further comprising a fifth portion of logic configured to pay for the diagnostic audit information.

* * * * *